United States Patent
Gysling

(10) Patent No.: US 6,609,069 B2
(45) Date of Patent: Aug. 19, 2003

(54) METHOD AND APPARATUS FOR DETERMINING THE FLOW VELOCITY OF A FLUID WITHIN A PIPE

(75) Inventor: Daniel L. Gysling, Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 65 days.

(21) Appl. No.: 09/729,994

(22) Filed: Dec. 4, 2000

(65) Prior Publication Data

US 2002/0095263 A1 Jul. 18, 2002

(51) Int. Cl.$^7$ ................................................ G06F 19/00
(52) U.S. Cl. ............................ 702/48; 702/49; 702/45; 73/861.06
(58) Field of Search .............................. 702/45, 48, 49; 73/861.06, 1.83; 367/154, 901

(56) References Cited

U.S. PATENT DOCUMENTS

| | | | | |
|---|---|---|---|---|
| 3,781,895 A | * | 12/1973 | Monser | 343/708 |
| 4,717,159 A | * | 1/1988 | Alston et al. | 330/129 |
| 5,948,959 A | * | 9/1999 | Peloquin | 367/154 |
| 6,354,147 B1 | * | 3/2002 | Gysling et al. | 73/579 |

FOREIGN PATENT DOCUMENTS

| | | |
|---|---|---|
| EP | 0 290 336 A1 | 11/1988 |
| WO | WO 00/00793 | 1/2000 |

OTHER PUBLICATIONS

I. Lee and J. Sung, Development of an array of pressure sensors with PVDF film, Experiments in Fluids 26, Jan. 8, 1999, Springer–Verlag.*

Krim and Viberg, "Two Decades of Array Processing Research" IEEE Signal Processing Magazine, Jul., 1996.

Beranek and Ver, "Noise and Vibration Control Engineering", John Wiley and Sons, ISBN 0–471–61751–2, p. 538.

* cited by examiner

Primary Examiner—John Barlow
Assistant Examiner—Stephen J. Cherry
(74) Attorney, Agent, or Firm—Ware, Fressola, Van Der Sluys & Adolphson LLP

(57) ABSTRACT

A method and corresponding apparatus for measuring the flow velocity of a fluid in an elongated body by sensing at more than one location along the elongated body, vortical disturbances convecting with the fluid, and correlating the outputs of the variously positioned sensors. The method includes the steps of: providing an array of at least two sensors disposed at predetermined locations along the elongated body, each sensor for sampling the pressure of the fluid at the position of the sensor at a predetermined sampling rate; accumulating the sampled data from each sensor at each of a number of instants of time spanning a predetermined sampling duration; and constructing from the accumulated sampled data at least a portion of a so called k-ω plot, indicative of a dispersion relation for the propagation of acoustic pressures emanating from the vortical disturbances, the constructing of the k-ω plot based on correlating the sampled data provided by at least one of the sensors with the sampled data acquired by at least one other of the sensors, and by autocorrelating the sampled data acquired by each sensor. The method usually also includes the steps of: using a feature extraction technique to identify a convective ridge in the k-ω plot; determining the orientation of the convective ridge in the k-ω plot; and determining the flow velocity based on a predetermined correlation of the flow velocity with the slope of the convective ridge of the k-ω plot.

4 Claims, 5 Drawing Sheets

METHOD AND APPARATUS FOR DETERMINING THE FLOW VELOCITY OF A FLUID WITHIN A PIPE

FIELD OF THE INVENTION

The present invention pertains to the field of processing unsteady pressure signals such as in the field of sonar, and more particularly to the field of measurements of the speed of a fluid when the direction of fluid flow is known, such as when the fluid flow is confined to a pipe.

BACKGROUND OF THE INVENTION

A nonintrusive measurement of flow velocity is desirable in many situations, including for example, in drilling for oil and natural gas, where the flow velocity of the production fluid containing the oil and gas being pumped from a formation must be monitored and controlled for efficient extraction. Fluid flow velocities in such applications are typically on the order of 10's of ft/sec through conduits (pipes) of less than 6" in inner diameter.

The term "flow velocity" is here used to mean average mixture velocity in the conduit. The flow velocity is related to the volumetric flow rate through the cross sectional area of the duct (i.e. volume flow rate=flow velocity times cross sectional area).

Standard flow measurement devices according to the prior art include orifice plates and venturis. Such devices are intrusive and require the measurement of pressure difference at two locations in the flow. The pressure difference is then related to flow rate. Other types of meters include turbine meters that spin in the flow. Such a meter relates the speed of rotation to the flow rate. Ultrasonic meters typically measure the difference in transit time with and against the flow within a pipe. Such a meter relates the difference in the transit times to the flow rate. All of these meters are either intrusive or require electronics.

Although the prior art teaches many methods to measure flow, both intrusive flow meters as well as flow meters based on non-intrusive methodologies, such as by measuring the time for an ultrasonic signal to propagate round trip between two sensors, for many applications what is needed is a method for determining flow velocity that is non-intrusive and at the same time avoids use of techniques such as measuring the time for an ultrasonic signal to propagate round trip between two sensors.

SUMMARY OF THE INVENTION

Accordingly, the present invention provides a method and corresponding apparatus for measuring the flow velocity of a fluid in an elongated body, the fluid traversing the elongated body substantially along the longest axis of the elongated body, the fluid bearing a vortical disturbance at a velocity correlated to the flow velocity, the vortical disturbance causing fluctuations in the pressure of the fluid near to the disturbance, the method comprising the steps of: providing an array of at least two sensors disposed at predetermined locations along the elongated body, each sensor for sampling the pressure of the fluid at the position of the sensor at a predetermined sampling rate; accumulating the sampled data from each sensor at each of a number of instants of time spanning a predetermined sampling duration; and constructing from the accumulated sampled data at least a portion of a so called k-ω plot, indicative of a dispersion relation for the propagation of acoustic pressures emanating from the vortical disturbances, the constructing of the k-ω plot based on correlating the sampled data provided by at least one of the sensors with the sampled data acquired by at least one other of the sensors, and by autocorrelating the sampled data acquired by each sensor.

In a further aspect of the invention, the method further comprises the steps of: using a feature extraction technique to identify a convective ridge in the k-ω plot; determining the orientation of the convective ridge in the k-ω plot; and determining the flow velocity based on a predetermined correlation of the flow velocity with the slope of the convective ridge of the k-ω plot.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention is based on the observation that vortical disturbances within a moving fluid (and other disturbances that convect with the flow) create noise, which can be sensed by pressure sensors, and that the vortical disturbances move at either the same velocity as the moving fluid, or at a velocity that can be correlated to the velocity of the moving fluid. The correlation can be performed by exploiting what is sometimes called the dispersion relationship associated with convective disturbances (i.e. $\omega = uk$, where $\omega$ is the angular frequency of the noise created by the vortical disturbance, $u$ is the velocity of the disturbance, and $k$ is the wavenumber of the noise). Convective disturbances in a flowing fluid can be viewed as disturbances that are fixed to the fluid. These disturbances have a spatial variation associated with them. Since the disturbance can be viewed as affixed to the fluid particles, the spatial variations result in temporal variations when sensed by stationary sensors. The spatial wavelength of the disturbances that move with the fluid is thereby linked to the temporal variations observed by the stationary sensors. The present invention relies on utilizing array processing techniques to identify this relationship and thereby determine the convection velocity of the fluid.

Figure 1:
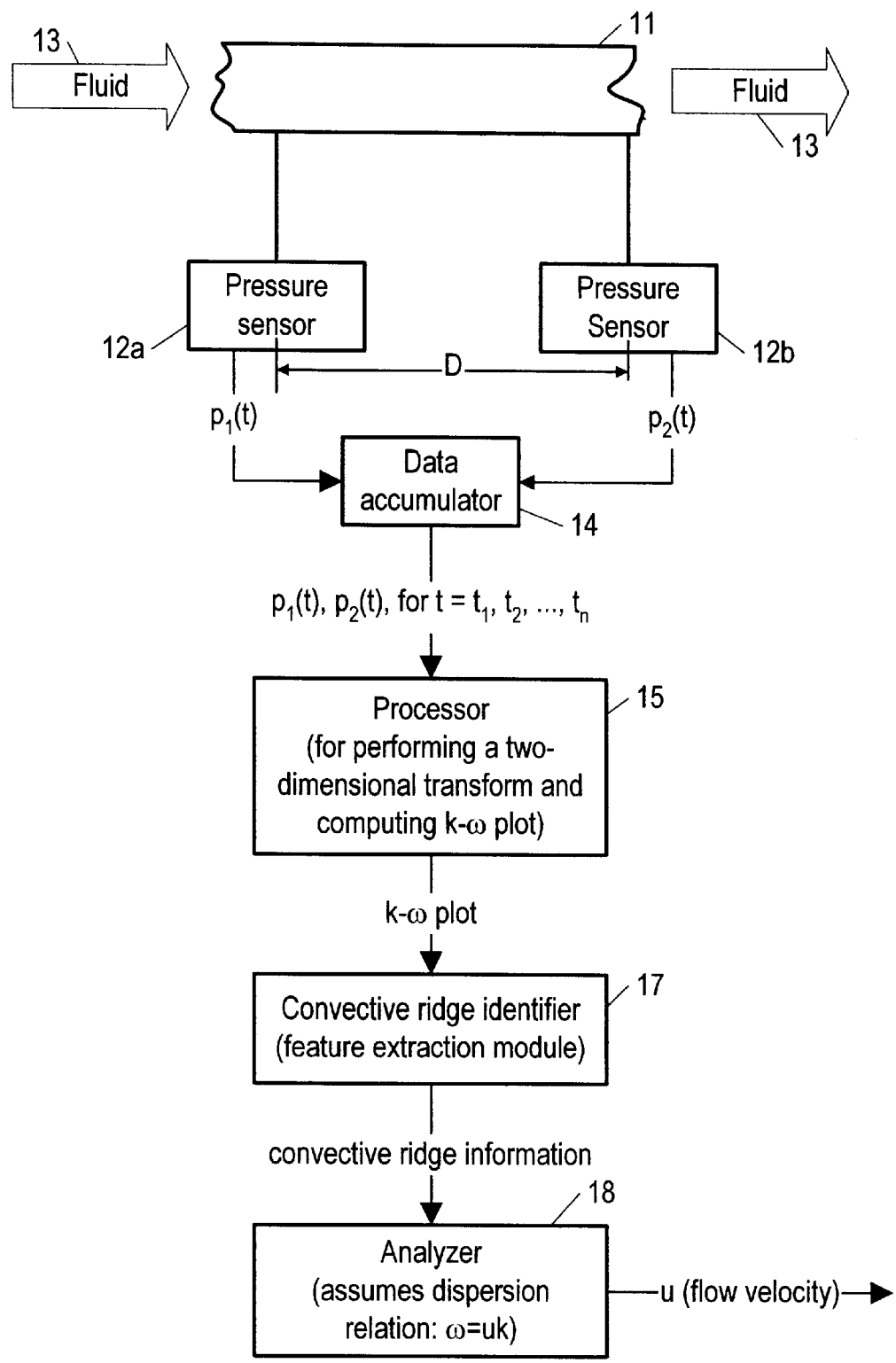
FIG. 1 is a flow diagram/schematic view of an apparatus according to the invention.

Referring now to FIG. 1, an apparatus for determining a volumetric flow rate of a fluid 13 within a conduit (pipe) 11 is shown as including an array of pressure sensors (transducers) 12a 12b disposed axially along the conduit for sensing pressure within the conduit at their respective locations. Each pressure sensor provides a signal indicating the pressure within the conduit, at the location of the sensor, at each instant in a series of sampling instants. A data accumulator 14 accumulates the signals from the pressure sensors, and provides the data accumulated over a sampling interval to a processor 15, which performs a spatial-temporal (two-dimensional) transform of the sensor data, from the xt domain to the kω domain, and then, in the preferred embodiment, determines what is called a k-ω plot. It has been found that differencing adjacent sensors in the array prior to calculating the k-ω plot helps to illuminate the convective ridge in flows in which the acoustic and other long wavelength disturbances mask the vortical disturbances.

To calculate the k-ω plot of either the pressure signals or the differenced pressure signals, the processor 15 must determine the wavelength and so the (spatial) wavenumber k, and also the (temporal) frequency and so the angular frequency w, of various of the spectral components of the acoustic (pressure) waves created by the vortical disturbances. There are numerous algorithms available in the public domain to perform the spatial/temporal decomposition of arrays of sensors.

In case of suitable vortical disturbances being present, the k-ω plot so determined will exhibit a structure that is called a convective ridge. The convective ridge represents the concentration of the disturbances that convect with the flow and is a mathematical manifestation of the relationship between the spatial variations and temporal variations described above. Such a plot will indicate a tendency for k-ω pairs to appear more or less along a line with some slope, the slope indicating the flow velocity, as is described in more detail below. The k-ω plot so determined is then provided to a convective ridge identifier 17, which uses one or another feature extraction method to determine the location and orientation (slope) of any convective ridge present in the k-ω plot. Finally, information including the convective ridge orientation (slope) is used by an analyzer 18 to determine the flow velocity.

The processor 15 uses standard so-called beam forming algorithms, i.e. algorithms for processing the sensor signals using various delays to create suitable phase relationships between the signals provided by the different sensors, thereby creating phased antenna array functionality. In other words, the beam forming algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $w=2\pi v$. The prior art teaches many algorithms of use in spatially and temporally decomposing a signal from a phased array of sensors, and the present invention is not restricted to any particular algorithm. The invention here is based on the discovery that such techniques can be used to determine flow rate, i.e. that the signals caused by vortical disturbances convecting with a flow are time stationary and have a coherence length long enough that it is practical to locate sensors apart from each other and yet still be within the coherence length.

Convective disturbances, including convective vortical disturbances, have a dispersion relationship that can be approximated by the straight-line equation, $$k=\omega/u,$$

where u is the convection velocity (flow velocity). A plot of k-ω pairs obtained from a spectral analysis of sensor samples associated with convective disturbances portrayed so that the energy of the disturbance spectrally corresponding to a particular pair is indicated in the plot, shows what might be described as a substantially straight ridge, a ridge that in turbulent boundary layer theory is called a convective ridge. What is being sensed are not discrete events of convective disturbance, but rather a continuum of possibly overlapping events forming a temporally stationary, essentially white process over the frequency range of interest. In other words, the convective disturbances, such as those generated by turbulent boundary layers, are distributed over a range of length scales and hence temporal frequencies.

Disturbances with these properties that convect with a fluid past the sensor array 12a 12b are transformed onto the convective ridge by the processor 15, the terminology ridge being appropriate because a k-ω plot indicates by one or another symbology the energy of k-ω pairs in the k-ω plane (i.e. the energy conveyed by the k-ω spectral component). Thus, identifying the convective ridge within the k-ω plane provides a means to determine the convective velocity. For flows within conduits, the convective velocity of unsteady pressure fluctuations associated with vortical disturbances is closely related to the average volumetric fluid velocity and therefore volumetric flow rate (flow velocity) within the conduit. In some situations, a vortical disturbance will have associated with it pure tone or set of tones and the corresponding k-ω plot will therefore not have a ridge, but instead only a portion of a ridge.

Once a k-ω plot is generated, the convective ridge identifier 17 uses one or another feature extraction methodology to discern a convective ridge and its orientation in the k-ω plane. In addition to automated techniques, a convective ridge can be located using even manual, visual inspection. In the preferred embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 17 provides information about the different trial convection velocities, information referred to generally as convective ridge information. The analyzer 18 examines the convective ridge information and, assuming the straight-line dispersion relation given by equation (1), determines the flow velocity and its uncertainty.

The processing technique used here in case of determining the flow velocity of a fluid is similar to an approach developed in case of determining the speed of propagation of sound waves within a fluid. The difference lies in the spatial and temporal characteristics of the disturbances in the two cases.

For turbulent boundary layers, the intensity of the turbulent fluctuations is roughly centered around $$\omega \cdot \delta^* \approx 1,$$

where $\delta^*$ is the displacement thickness of the boundary layer, a well known parameter in boundary layer analysis. For a three-inch pipe, assuming the displacement thickness of the boundary layer is 0.15 times the radius of the pipe, the center frequency in Hz of the turbulent energy is approximately $\sim 10 \cdot u$ (with u in ft/sec). Thus, for flows in the 1–30 ft/sec regime, the convected energy resides at temporal frequencies below 10–300 Hz. For fully developed flow in a three-inch (typical) pipe, the spatial wave numbers of this peak activity is roughly constant with a wave number of 60 $ft^{-1}$, or, in terms of wavelengths, of roughly 0.1 ft. These estimates are used to design the array of sensors 12a 12b so as to be suitably placed to be able to identify the convective ridge and thereby yield a measurement of the flow velocity.

As a comparison, the wavelength of an acoustic disturbance (sound) in a fluid in which sound in the frequency range of 10–300 Hz travels at 5,000 ft/sec, is in the range from 17–500 ft. Thus, although the propagation and methods to determine the sound propagation velocity on the one hand and the flow velocity on the other hand are similar, the time scales and length scales differ significantly. Moreover, it is hardly evident that the same techniques used to determine the speed of propagation of an acoustic wave, i.e. a wavelike disturbance, could be applied to determining flow velocity based on convected vortical disturbances.

Beam forming methods also rely on signal coherence among the sensors 12a 12b in the sensor array. Vortical disturbances and acoustic waves differ significantly in this area as well.

One-dimensional acoustic disturbances (and so not including a vortical disturbance) typically have large coherence lengths, often over thousands of feet when propagating in pipes. Vortical disturbances, on the other hand, have much smaller coherence lengths, typically extending over length scales determined by the diameter of the pipe.

In sensing both spatial and temporal characteristics of a wavelike phenomenon using an array of sensors, the spatial length scales and coherence lengths of the phenomenon constrain the length scale of the array. Thus, in the case of measuring the flow velocity by sensing vortical disturbances, sensors must be closely spaced and located within a limited axial region; for flow velocities of less than 30 ft/sec in a three-inch diameter pipe, the sensors should usually be spaced less than 6" apart.

Figure 2:
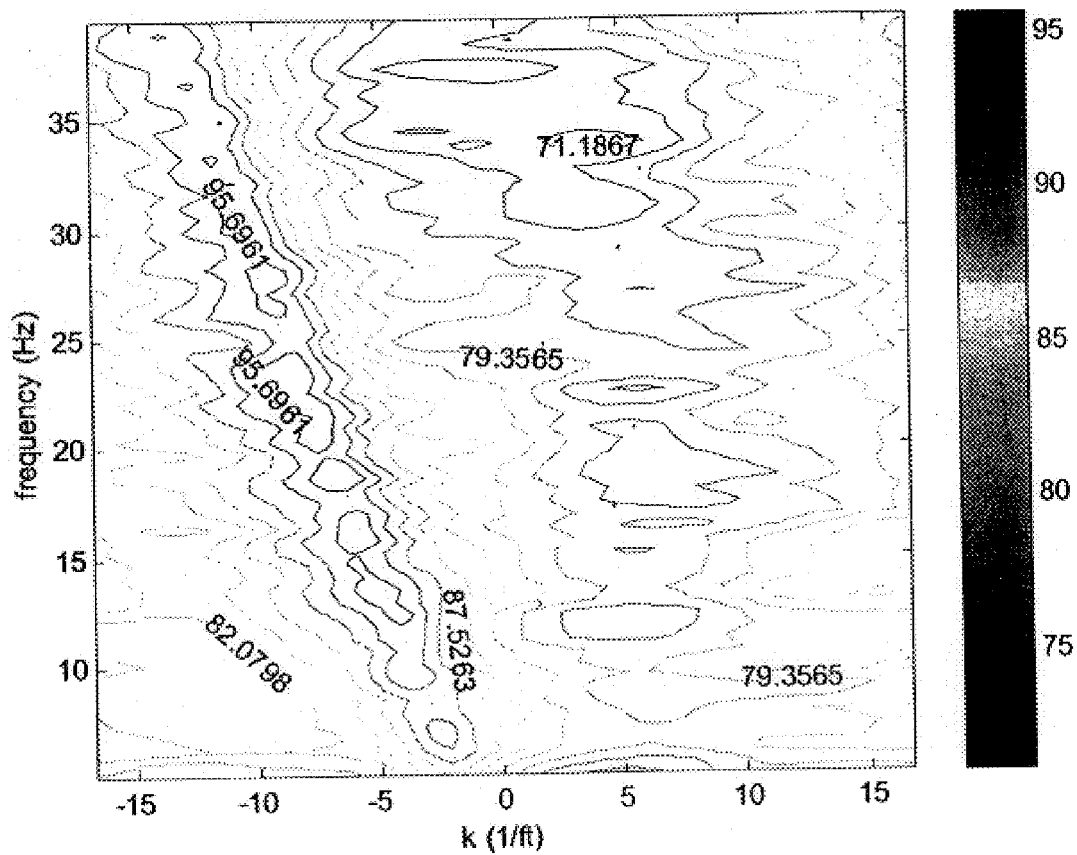
FIG. 2 is a k-ω plot constructed according to the present invention, showing a convective ridge.

A particular embodiment of the present invention used an array of four sensors separated by 1.8 inches on a two-inch diameter pipe. FIG. 2 shows a k-ω plot generated from the output of the four sensors. The wave number (spatial characteristic) is plotted on the ordinate and the frequency (temporal characteristic) is plotted on the abscissa. The intensity of each k-ω pair is indicated using contours. Disturbances propagating from left to right (in the direction of the flow) map into the right half-plane, and disturbances traveling in the opposite direction map into the left half-plane.

The span of the array is bounded not only by coherence lengths of a vortical disturbance, but also by the need to avoid (or at least recognize) spatial aliasing, which is analogous to temporal aliasing. If a pair of sensors spans a distance $\Delta x$, then the pair of sensors cannot distinguish between disturbances with a wavelength equal to $2\Delta x$ and disturbances with a wavelength that is an integral multiple of $2\Delta x$. Thus, the minimum wavelength that can be resolved unambiguously by two sensors at a spacing of $\Delta x$ is given by, $$\lambda = 2\Delta x,$$

which corresponds to a maximum resolvable wave number given by, $$k = \frac{\pi}{\Delta x}.$$

For the above-mentioned embodiment, the maximum resolvable wave number was $k \equiv 21$ ft$^{-1}$. For disturbances with spatial wavenumber higher than the Nyquist wavenumber, the information wraps back into the k-ω plane. Nevertheless, if properly interpreted, this aliased information can still provide useful information.

Similarly, the maximum resolvable temporal frequency is determined by the sample frequency. For the above-mentioned embodiment, the sample frequency was 5000 Hz, and therefore of sufficient bandwidth to resolve the 0–100 Hz frequency span of the k-ω plot.

As mentioned above, although automated techniques can be used to identify a convective ridge and determine its orientation (slope), even a manual best fit of a straight line gives acceptable results. These automated methods can account for aliased data as well. For the above-mentioned embodiment for which a k-ω plot is shown in FIG. 2, the straight line resulting from a manual straight line fit is indicated in FIG. 2. The straight line has a slope of $\Delta w/\Delta k = 17.8$ ft/sec (after converting the frequency ν used as the ordinate to the corresponding angular frequency ω by multiplying the frequency ν by 2π), which, as explained above, is either equal to the flow velocity or is correlated to the flow velocity in a determinate way.

It should be noted that a convective ridge is only approximated by a straight line. In reality, vortical structures of varying length convect at slightly different speeds resulting in curvature in the convective ridge, curvature which will be noticeable in a k-ω plot. However, the straight-line approximation is useful for extracting a meaningful estimate of the flow velocity. Also, it should be emphasized that what is actually determined by the method of the present invention is the average convection velocity of vortical disturbances, and so represents an approximation to the average volumetric velocity within the pipe. The actual flow is complex and the correlation between measured convection velocity (of vortical disturbances) and average volumetric velocity may require calibration.

Figure 3:
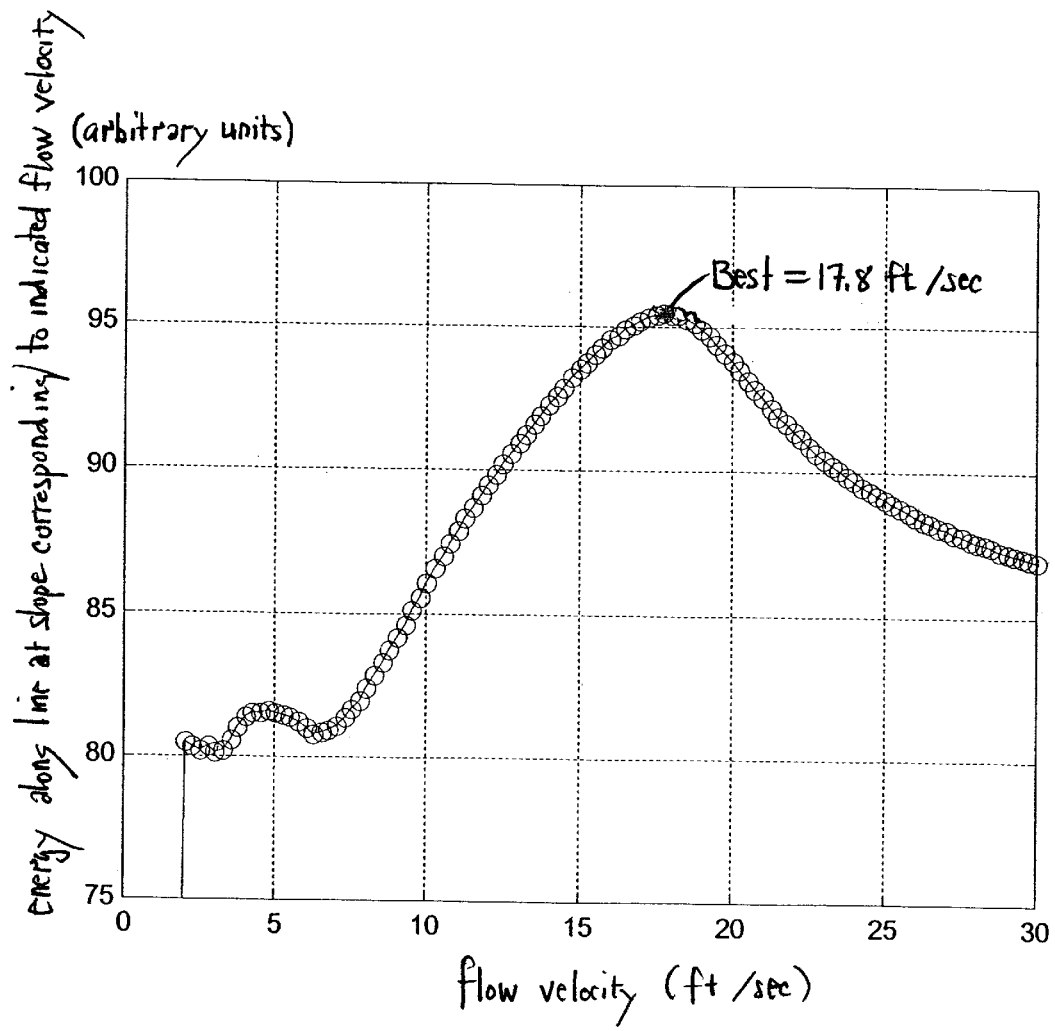
FIG. 3 is a plot showing the result of a calculation to determine the slope of the convective ridge in the k-ω plot of FIG. 2.

FIG. 3 shows the results of using the Capon method to determine a best fit to the convective ridge for the k-ω plot of FIG. 2. Like the slant stack method, the Capon method essentially sums the energy of k-ω pairs on a straight line associated with a trial convective velocity. The summation is performed for a range of trial velocities, and the convective ridge has an orientation that is the slope of the straight line having the largest accumulated energy.

Figure 4:
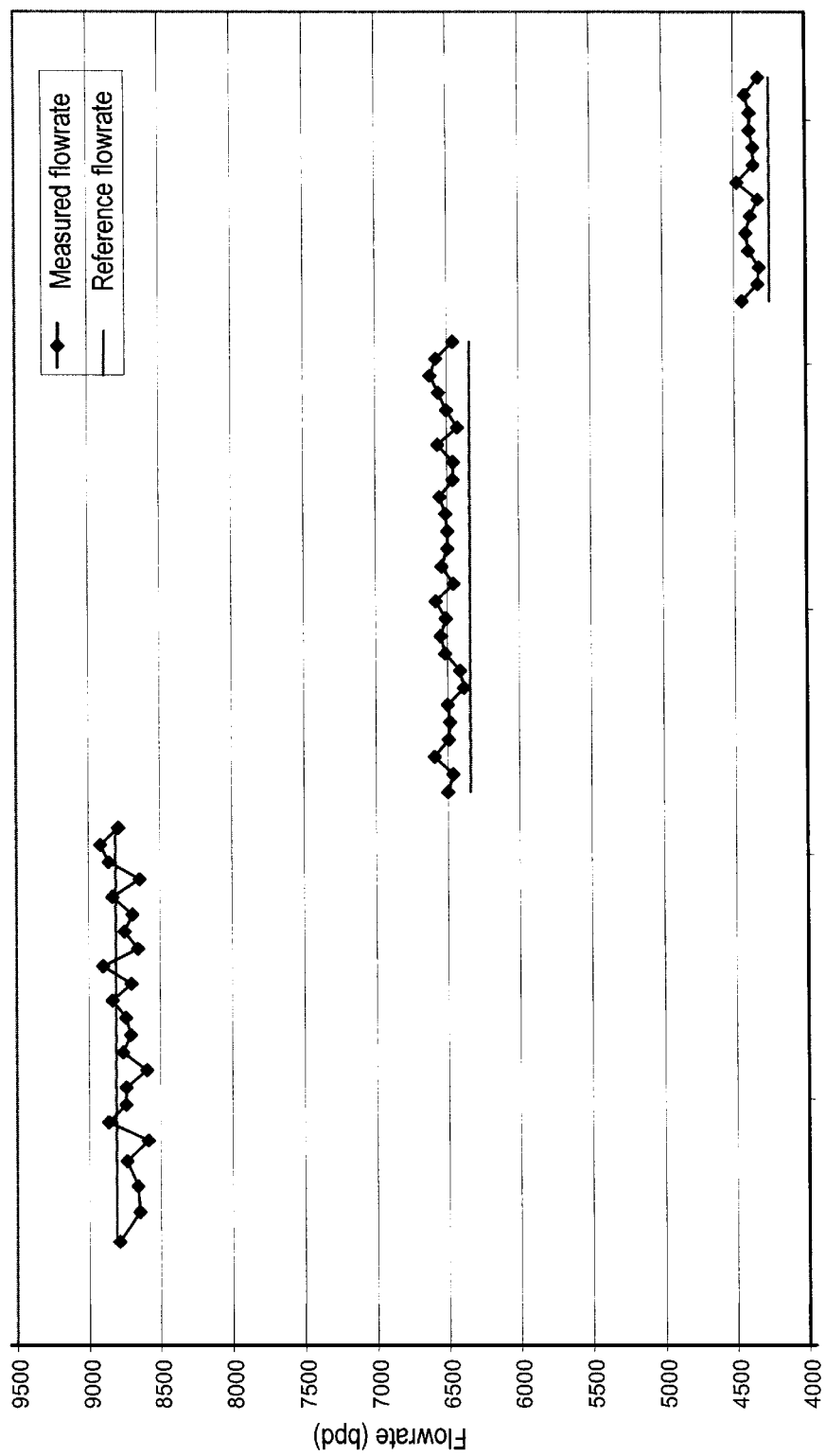
FIG. 4 is a plot comparing the results for a range of flow velocities using the present invention with the results obtained using a standard reference measurement.
Figure 5:
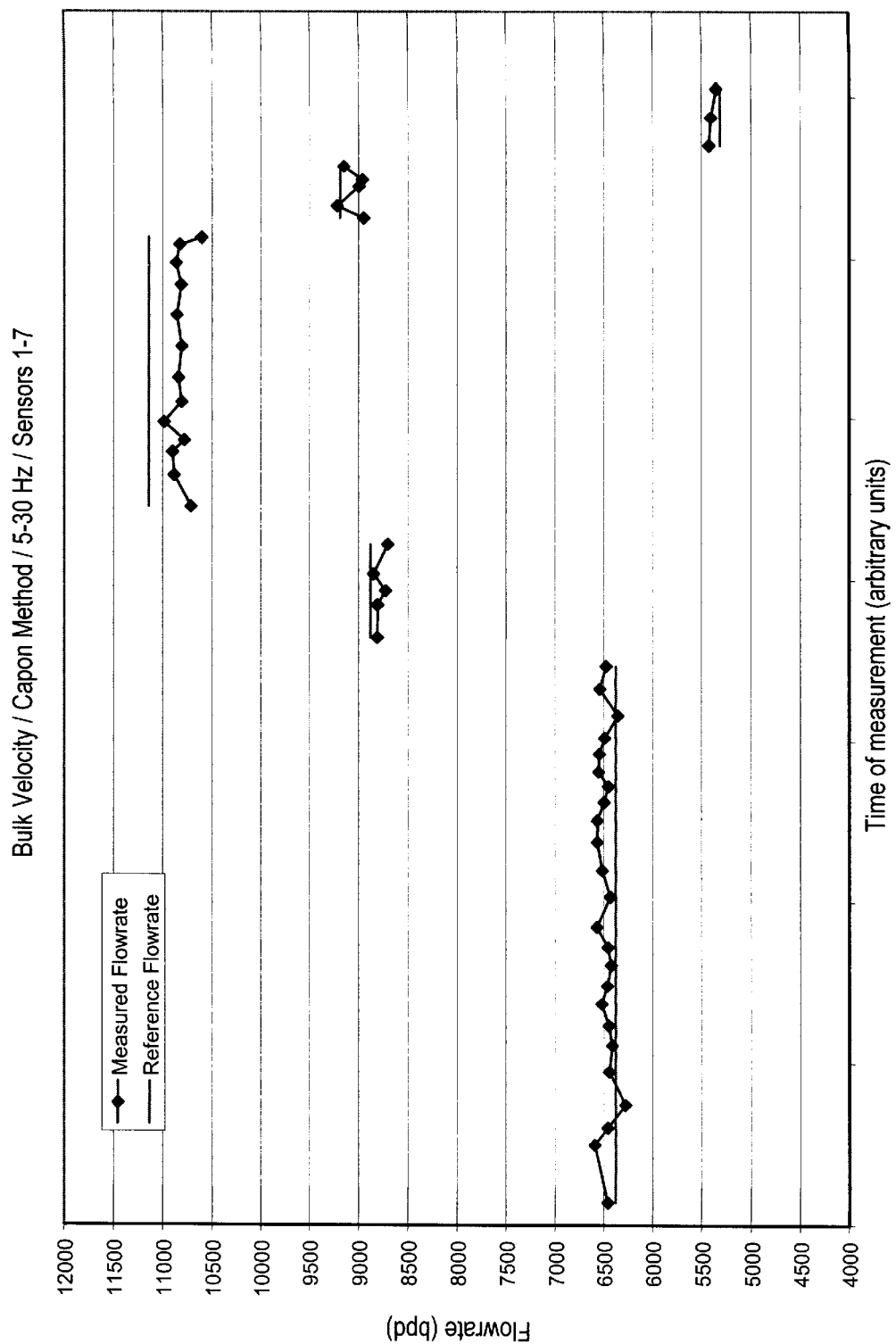
FIG. 5 is another plot comparing the results of the present invention for a range of flow velocities with the results obtained by a standard reference measurement.

FIGS. 4 and 5 show the results of one embodiment of the present invention for determining flow velocity compared to results using a standard reference measurement. Flow rate is given in barrels per day (bpd). The embodiment used a uniform axial array of seven pressure sensors and used the Capon method to determine a k-ω plot. The comparison shows that the present invention provides a reasonably accurate estimate of the flow velocity of a fluid within a pipe over a useful range of flow velocities.

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A method for use in measuring the flow velocity of a fluid flowing through an elongated body substantially along the longest axis of the elongated body, the method comprising the steps of:

providing an array of at least two sensors disposed at predetermined locations along the elongated body, each sensor for sampling the pressure of the fluid at the position of the sensor at a predetermined sampling rate;

accumulating the sampled data from each sensor at each of a number of instants of time spanning a predetermined sampling duration;

determining from the accumulated sampled data at least a portion of a k-ω plot, indicative of a dispersion relation for the propagation of acoustic pressures emanating from the fluid flowing through the elongated body, the determining of the k-ω plot based on correlating the sampled data provided by at least one of the sensors with the sampled data acquired by at least one other of the sensors, and by autocorrelating the sampled data acquired by each sensor;

identifying a convective ridge in said at least a portion of a k-ω plot;

determining the orientation of the convective ridge;

determining the flow velocity of the fluid flowing through the elongated body based on a predetermined correlation of the flow velocity with the orientation of the convective ridge; and providing an output of the flow velocity of the fluid flowing through the elongated body.

2. A method as in claim 1, wherein a feature extraction technique is used to identify the convective ridge.

3. An apparatus for use in measuring the flow velocity of a fluid flowing through an elongated body substantially along the longest axis of the elongated body, the apparatus comprising:

an array of at least two sensors disposed at predetermined locations along the elongated body, each sensor for sampling the pressure of the fluid at the position of the sensor at a predetermined sampling rate;

means for accumulating the sampled data from each sensor at each of a number of instants of time spanning a predetermined sampling duration;

means for determining from the accumulated sampled data at least a portion of a k-ω plot, indicative of a dispersion relation for the propagation of acoustic pressures emanating from a fluid flowing through the elongated body, the determining of the k-ω plot based on correlating the sampled data provided by at least one of the sensors with the sampled data acquired by at least one other of the sensors, and using an autocorrelation of the sampled data acquired by each sensor;

means for identifying a convective ridge in said at least a portion of a k-ω plot;

means for determining the orientation of the convective ridge;

means for determining the flow velocity of a fluid flowing through the elongated body based on a predetermined correlation of the flow velocity with the orientation of the convective ridge; and means for providing an output of the flow velocity of the fluid flowing through the elongated body.

4. An apparatus as in claim 3, wherein the means for determining the convective ridge uses a feature extraction technique.

* * * * *